United States Patent [19]

Suzuki

[11] Patent Number: 5,426,483
[45] Date of Patent: Jun. 20, 1995

[54] CAMERA WITH A LINE OF SIGHT DETECTING DEVICE

[75] Inventor: Fumio Suzuki, Yokohama, Japan

[73] Assignee: Nikon Corporation, Tokyo, Japan

[21] Appl. No.: 117,671

[22] Filed: Sep. 8, 1993

[30] Foreign Application Priority Data

Sep. 14, 1992 [JP] Japan .................. 4-245197

[51] Int. Cl.⁶ .............................................. G03B 7/00
[52] U.S. Cl. ...................... 354/410; 354/62; 354/219
[58] Field of Search ............... 354/400, 402, 410, 62, 354/219

[56] References Cited

U.S. PATENT DOCUMENTS

| | | | |
|---|---|---|---|
| 5,036,347 | 7/1991 | Tsunekawa et al. | 354/62 |
| 5,182,442 | 1/1993 | Suda et al. | 354/219 |
| 5,214,466 | 5/1993 | Nagano et al. | 354/62 |
| 5,231,674 | 7/1993 | Cleveland et al. | 351/210 |
| 5,245,371 | 9/1993 | Nagano et al. | 354/219 |
| 5,253,008 | 10/1993 | Konishi et al. | 354/219 |
| 5,280,312 | 1/1994 | Yamada et al. | 351/211 |
| 5,291,234 | 3/1994 | Shindo et al. | 354/402 |
| 5,296,888 | 3/1994 | Yamada | 354/219 |
| 5,298,927 | 3/1994 | Konishi et al. | 351/211 |

FOREIGN PATENT DOCUMENTS

| | | |
|---|---|---|
| 61-172552 | 8/1986 | Japan . |
| 1-241511 | 9/1989 | Japan . |
| 2-5 | 1/1990 | Japan . |

Primary Examiner—Russell E. Adams
Attorney, Agent, or Firm—Shapiro and Shapiro

[57] ABSTRACT

In a camera with a line of sight detecting device, the optical axes of an observation optical system, illuminating means and photoelectric converting means are disposed so as to differ from one another, whereby it never happens-that in the observation optical system, illuminating light creates ghost, and the calculation of the direction of line of sight can be accomplished effectively.

8 Claims, 10 Drawing Sheets

CENTER OF PUPIL D=(d1+d2)/2

CENTER OF PUPIL D=(d1+d2)/2

CAMERA WITH A LINE OF SIGHT DETECTING DEVICE

BACKGROUND OF THE INVENTION

1. Field of the Invention

This invention relates to a camera with a line of sight detecting device having the function of detecting a photographer's line of sight and detecting an object to be photographed.

2. Related Background Art

In recent years, there have been proposed numerous cameras each carrying thereon a line of sight detecting device for detecting the direction of a photographer's line of sight and utilized for distance measurement, photometry or the like. Most line of sight detecting methods presented by these cameras have been such that infrared light is applied to a photographer's eyeball and the rotation angle of the eyeball is calculated by the use of Purkinje's first image, which is a corneal reflected image, and the positions of the centers of the pupil and iris, are detected thereby detecting the direction of the photographer's line of sight.

One of the line of sight detecting methods as described above is disclosed in Japanese Laid-Open Patent Application No. 61-172552, and an example in which this method is utilized in a camera or the like is disclosed in Japanese Laid-Open Patent Application No. 2-5.

In Japanese Laid-Open Patent Application No. 61-172552, a parallel beam of infrared light is applied from on the optical axis of an observation optical system to an observer's eyeball, and Purkinje's first image and the center of the pupil are detected to thereby detect the direction of line of sight.

In the prior-art device, illuminating means and photoelectric converting means are disposed coaxially with each other on the optical axis of the observation optical system. Therefore, the illuminating light by the illuminating means has created ghost in the observation optical system and it has entered the light receiving optical system of the photoelectric converting means, thus adversely affecting the detection of the direction of line of sight.

SUMMARY OF THE INVENTION

The present invention provides a camera with a line of sight detecting device comprising an observation optical system for observing an object therethough, illuminating means for illuminating a photographer's eye, and line of sight detecting means having photoelectric converting means for photoelectrically converting reflected light from said eye illuminated by said illuminating means, which is designed such that the optical axes of the observation optical system, the illuminating means and the photoelectric converting means differ from one another, the illuminating means illuminates the eye by light dividing means disposed between the observation optical system and the eye, and the photoelectric converting means receives the reflected light from the eye by the light dividing means and effects photoelectric conversion.

The optical axes of the observation optical system, the illuminating means and the photoelectric converting means are disposed so as to differ from one another, whereby the illuminating light does not create ghost in the observation optical system and the calculation of the direction of line of sight can be effectively accomplished.

DESCRIPTION OF THE PREFERRED EMBODIMENTS

Some embodiments of the present invention will hereinafter be described with reference to the drawings.

Figure 1:
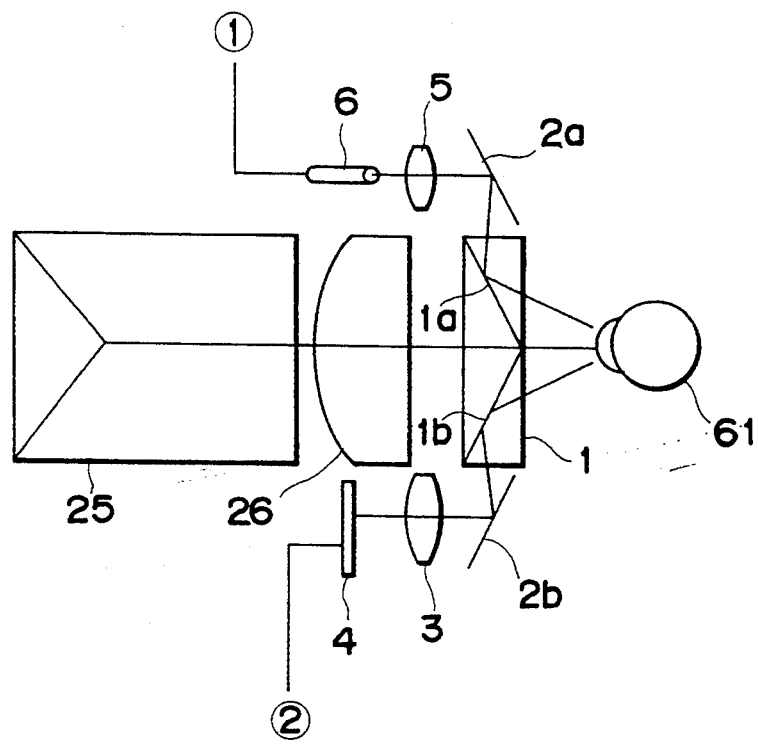
FIG. 1 is a schematic view of a line of sight detecting optical system according to an embodiment of the present invention.
Figure 2:
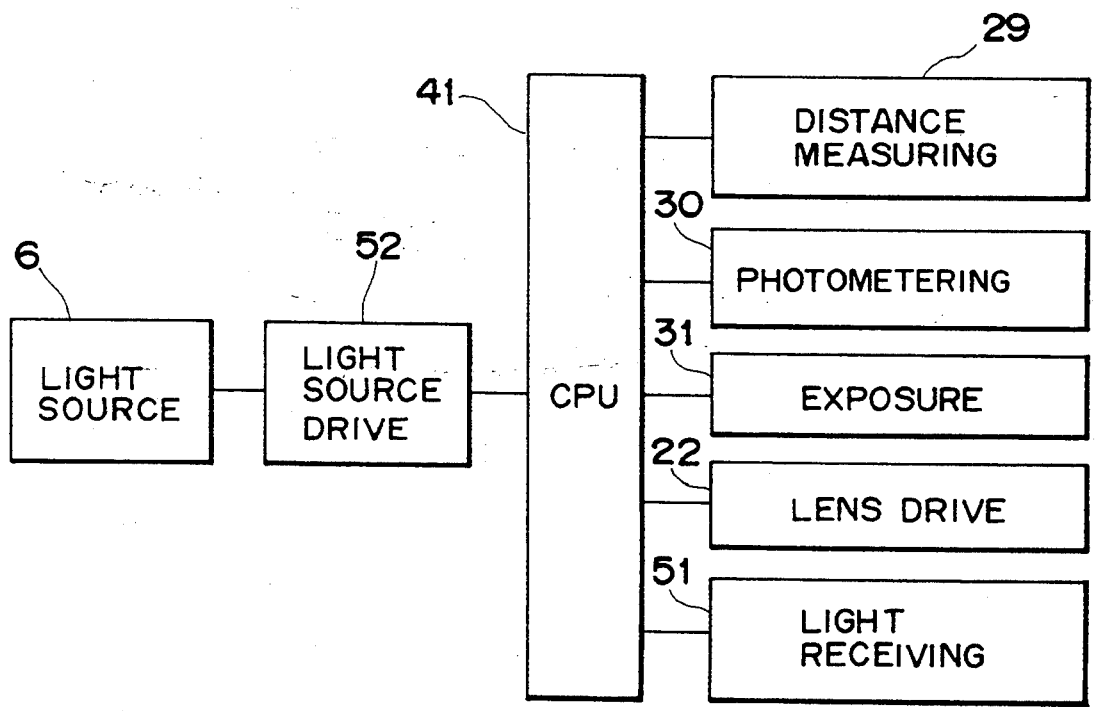
FIG. 2 is a block diagram of a camera with a line of sight detecting device according to an embodiment of the present invention.
Figure 3:
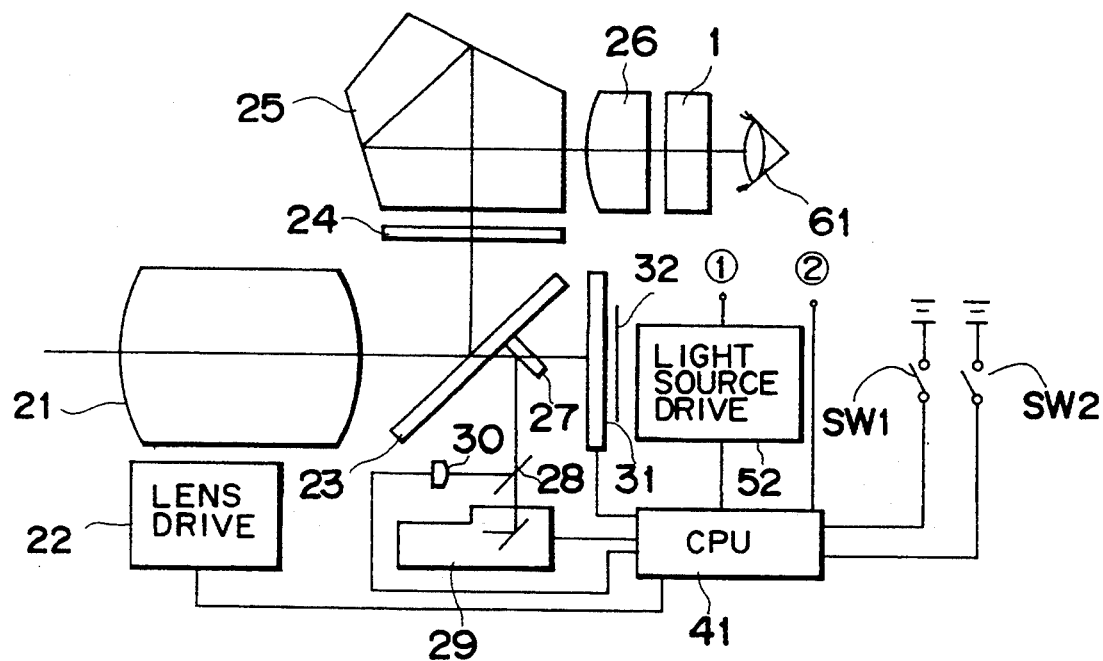
FIG. 3 shows a construction including the optical system of a camera with a line of sight detecting device according to an embodiment of the present invention.
Figure 4:
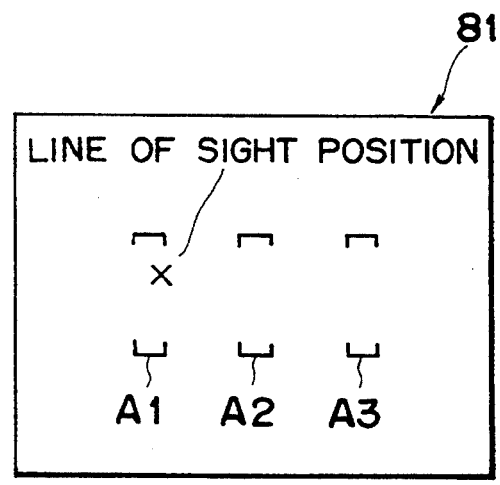
FIG. 4 shows distance measuring areas within a finder.

FIG. 1 is a schematic view of the line of sight detecting optical system of a camera with a line of sight detecting device according to a first embodiment of the present invention. FIG. 2 is a block diagram showing the construction of the first embodiment of the present invention. FIG. 3 shows the construction of the present embodiment including the optical system of the camera with a line of sight detecting device. FIG. 4 shows an AF area within a finder.

In FIGS. 2 and 3, a control unit 41 is a control unit (CPU) for effecting the general control of the camera with a line of sight detecting device according to the first embodiment.

A distance measuring unit 29 is designed such that in a plurality of distance measuring areas A1, A2 and A3 within a finder 81, (FIG. 4) distance measurement is effected for the respective distance measuring areas. In this embodiment, the distance measuring areas are discrete AF areas, but alternatively, they may be a continuous AF area.

A photometering unit 30 is such that photometry is effected in a photometering area within the finder 81 which is divided into a plurality of areas.

An exposure unit 31 effects the exposing operation on the basis of the control signal of the control unit 41.

A lens drive unit 22 drives and controls a photo-taking lens 21 by the control unit 41.

A light receiving unit 51 for a line of sight is a light receiving unit for detecting the line of sight, and is comprised of a light receiving optical system 3 and a light receiving element 4. From the output signal of this light receiving unit, the position of Purkinje's first image and the central position of pupil are detected by the control unit 41, and on the basis of the position of this Purkinje's first image and the position of the center of pupil, the direction of line of sight is calculated by the control unit 41.

A light source drive unit 52 is a drive unit for a light source for line of sight detection, and the turn-on and turn-off of the light source are controlled by the control unit 41.

A light source 6 is a light source for illuminating the cornea of an eye 61, and as shown in FIG. 1, the light of this light source passes through a light projecting optical system 5, is bent toward a light divider 1 by a mirror 2a, is reflected by a light dividing surface 1a in the light divider 1 and is applied to the photographer's eye 61.

A half-depression switch SW1 is connected to the control unit 41 and is adapted to be closed by the half depression of a release button.

A full depression switch SW2 is connected to the control unit 41 and is adapted to be closed by the full depression of the release button.

In FIG. 1, the light source 6 is for illuminating the eye 61 and is connected to the control unit 41, and its turn-on is controlled by the control unit 41. The light source 6 is an infrared light emitting element, and an infrared light beam emitted by the light source 6 passes through the light projecting optical system 5 and is applied to the photographer's eye 61 by the mirror 2a and the light dividing surface 1a of the light divider 1.

The infrared light beam of the light source 6 reflected by the eye 61 is bent away from the side of the light source 6 by a light dividing surface 1b in the light divider 1, is further bent by a mirror 2b and passes through the light receiving optical system 3 to the light receiving element 4. The light dividing surfaces 1a and 1b are dichroic mirrors transmitting visible light therethrough and reflecting infrared light, and as the light receiving element 4, use is made of a device comprising one-dimensionally or two dimensionally arranged photoelectric conversion elements. Also, the light receiving element 4 is disposed so as to be conjugate with the vicinity of the pupil of the photographer's eye 61 with respect to the light receiving optical system 3. Therefore the reflected image by the cornea of the photographer's eye 61, i.e., Purkinje's first image, and the image of the boundary between the pupil and iris, or the image of the eye 61 are formed on the light receiving element 4. The light receiving element 4 is connected to the control unit 41, and the signal of the light receiving element 4 is sent to the control unit 41.

In FIG. 3, the object light passed through the photo-taking lens 21 is divided into a finder screen 24 side and a film 32 side by a main mirror 23. Also, the film 32 side light has its optical path bent by a sub-mirror 27 and is directed to the distance measuring unit 29. Further, the light to the distance measuring unit 29 has its optical path bent by a half mirror 28 and is directed to the photometering unit 30. On the other hand, the light directed to the finder screen 24 side by the main mirror 23 is imaged on the finder screen 24. This formed object image is directed to the photographer's eye 61 by a pentagonal prism 25 and an eyepiece 26.

The operation of the first embodiment of the present invention will be described hereinafter.

Figure 5:
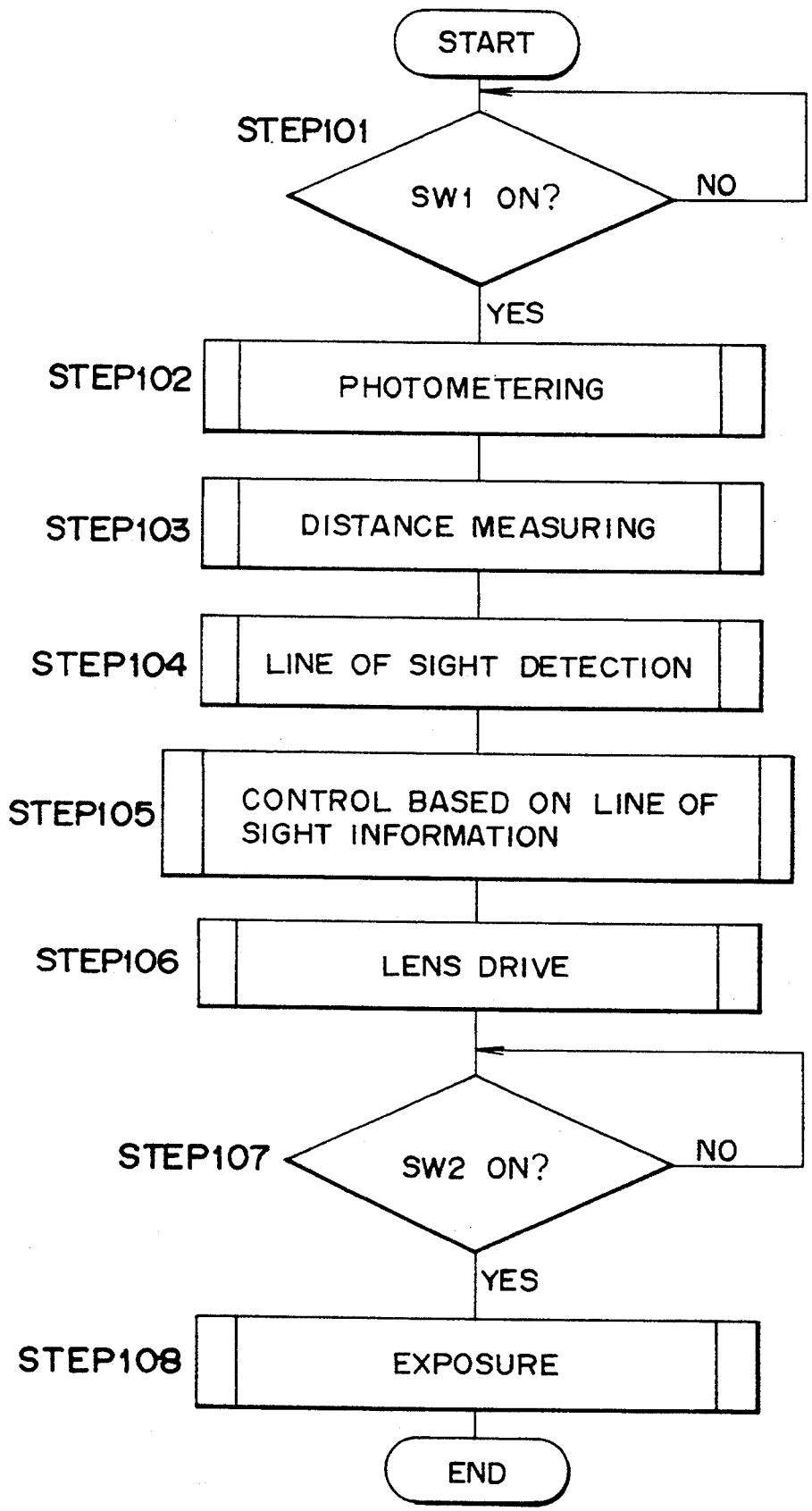
FIG. 5 is a flow chart showing the operation of the above-mentioned camera with a line of sight detecting device.

FIG. 5 is a flow chart showing the operations from the closing of a power source switch during the photographing by the above-described camera with a line of sight detecting device to the exposing operation (release operation), and the flow is executed upon the closing of the power source switch.

In FIG. 5:

STEP 101: Whether the half-depression switch SW1 is ON is judged, and if it is ON, advance is made to STEP 102, and if it is not ON, STEP 101 is repeated.

STEP 102: Here, photometering is effected by the photometering unit 30. The photometered values of the respective areas are stored in the memory portion in the control unit 41.

STEP 103: Here, distance measurement is effected by the distance measuring unit 29. Distance measurement for the distance measuring areas A1, A2 and A3 shown in FIG. 4 is effected, and the respective distance measured values are stored in the memory portion in the control unit 41.

STEP 104: Here, a line of sight detection subroutine for performing the line of sight detecting operation is executed. As will be described later in detail, in this embodiment, the direction of line of sight is calculated from the position of Purkinje's first image and the position of the center of the pupil described above in connection with the prior art. For example, the location of a mark X in FIG. 4 is detected as the line of sight position.

STEP 105: Here, on the basis of the direction of line of sight calculated at STEP 104, the control of photometering and distance measurement is effected by the use of the information obtained at STEP 102 and STEP 103. As regards the control of distance measurement, calculation is effected on the basis of the distance measuring information of the distance measuring area A1 corresponding to the line of sight position indicated by the mark X. As regards the control of photometering, calculation is effected by a summation addition meant with the area corresponding to the line of sight position indicated by the mark X as the centroid.

STEP 106: Here, on the basis of the distance measuring information determined at STEP 105, the driving of the photo-taking lens 21 is effected by the lens drive unit 22.

STEP 107: Whether the full depression switch SW2 is ON is judged, and if it is ON, advance is made to STEP 108, and if is not ON, STEP 107 is repeated.

STEP 108: Here, on the basis of the photometering information determined at STEP 105, a series of exposing operations such as mirror up, shutter running, mirror down, film feeding and shutter charge are performed by the exposure unit 31. When the exposing operations are terminated, a series of operations are terminated. After STEP 108 is terminated, return may be made to STEP 101, and this routine may continue to be executed until the power source switch is opened.

Line of sight detection will now be described.

Figure 6:
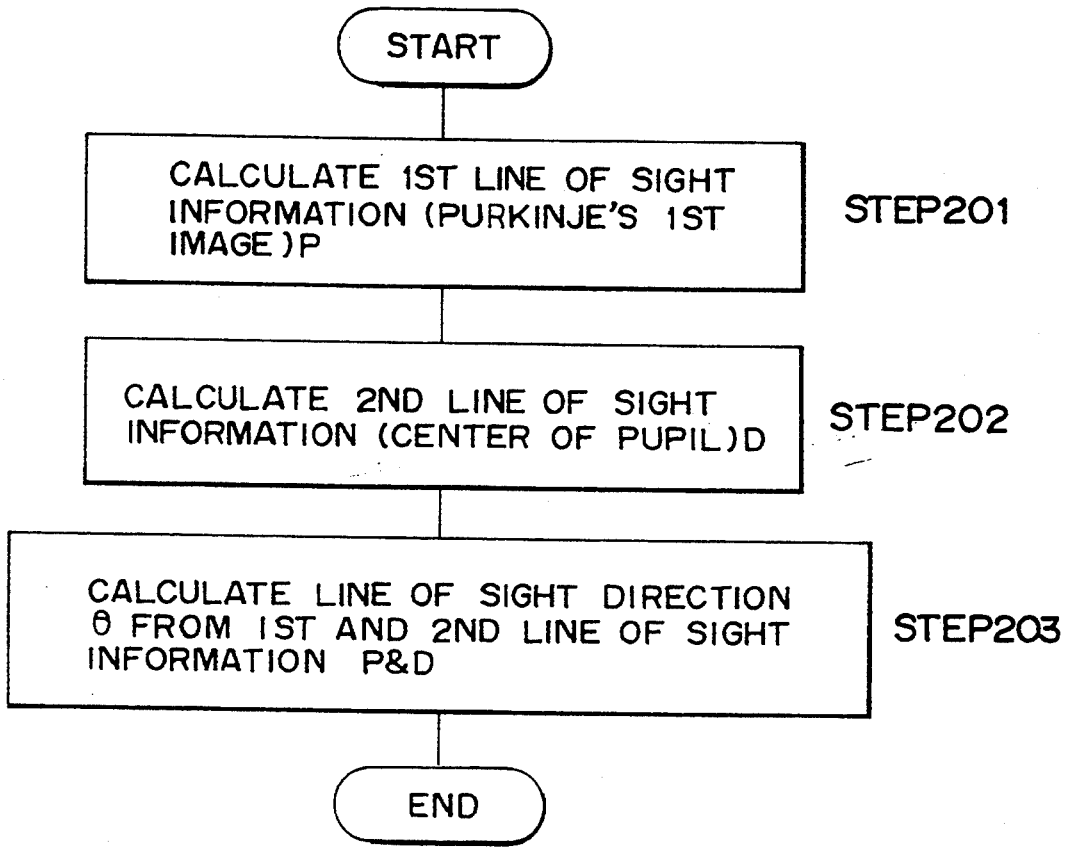
FIG. 6 is a flow chart showing the subroutine of line of sight detection.

FIG. 6 is a flow chart of the line of sight detection subroutine.

Figure 7:
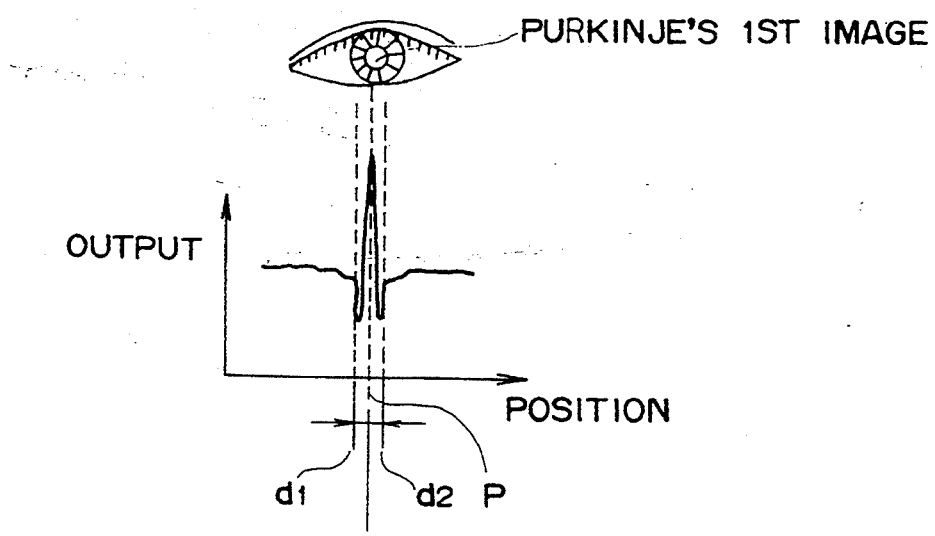
FIG. 7 shows the output of light receiving means with respect to the position of Purkinje's first image and the position of the center of pupil.

In FIG. 6:

STEP 201: Here, the position of Purkinje's first image is calculated from a signal from the light receiving unit 51 for line of sight. The position of Purkinje's first image is found as a peak position P from the output of the light receiving unit 51 for line of sight as shown in FIG. 7.

STEP 202: Here, the position of the center of the pupil is calculated from a signal from the light receiving unit 51 for line of sight. From the output of the light receiving unit 51 for line of sight as shown in FIG. 7, boundaries d1 and d2 at which the output becomes concave is detected, and the position of the center of the pupil is found as the center position D of the boundaries d1 and d2.

STEP 203: Here, the direction $\theta$ of line of sight is calculated from the Purkinje's first image position information P and the pupil center position information D obtained at STEP 201 and STEP 202.

The calculation of the direction of line of sight is effected as $$\theta = \text{Sin}^{-1}[(D-P)/(A-\rho)],$$

where
A: the distance from the center of rotation of the eyeball to the center of the pupil;
$\rho$: the distance from the center of rotation of the eyeball to the center of curvature of the cornea.

The direction $\theta$ of line of sight is calculated from the above expression, and the line of sight detection subroutine is terminated.

As described above, in the first embodiment of the present invention, the optical axes of the observation optical system, the illuminating means and the light receiving means are disposed so as to differ from one another. More particularly, as shown in FIG. 1, the optical axes intersect the photographer's eyeball in different directions. Therefore it never happens that the ghost of the illuminating light affects the light receiving means, and the calculation of the direction of line of sight can be effected efficiently. Further in the present embodiment, the illuminating means and the light receiving means are discretely disposed at the opposite sides of the light dividing means, and this leads to a construction advantageous in terms of space. Also, the light dividing means is formed by an optical member having no refractive power and therefore, its influence upon the optical performance of the observation optical system is little.

Figure 8:
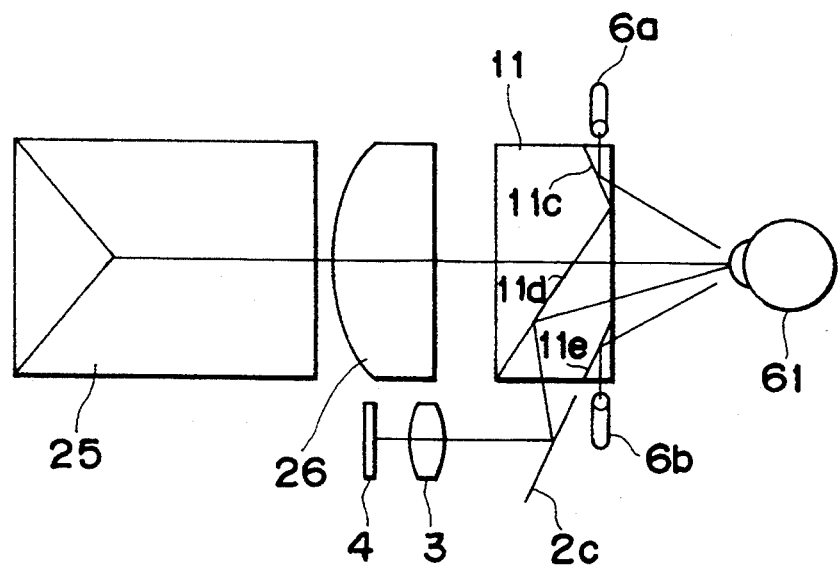
FIG. 8 shows the construction of a second embodiment of the present invention.

FIG. 8 shows a second embodiment of the present invention.

In FIG. 8, a light source 6a and a light source 6b are disposed at the opposite sides of a light divider 11.

The light sources 6a and 6b are infrared light emitting elements and are for illuminating the eye 61.

An infrared light beam emitted by the light source 6a is reflected by the light dividing surface 11c of the light divider 11 and illuminates the eye 61.

An infrared light beam emitted by the light source 6b is reflected by the light dividing surface 11e of the light divider 11 and illuminates the eye 61.

The infrared light beam reflected by the eye 61 is further reflected by the light dividing surface 11d of the light divider 11 and a mirror 2c, and passes through a light receiving optical system 3 to a light receiving element 4.

In the other points of construction and control, the second embodiment is similar to the first embodiment.

Therefore, when the photographer rotates his eye 61, one of the Purkinje's first images by the two light sources 6a and 6b can be detected to thereby calculate the direction of line of sight.

Figure 9:
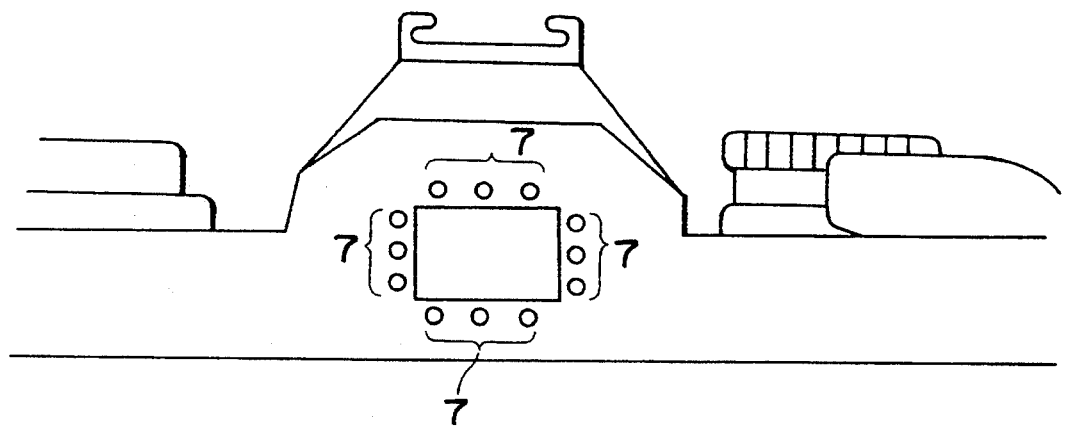
FIG. 9 shows the disposition of light sources in a third embodiment of the present invention.

FIG. 9 shows light sources in a third embodiment of the present invention.

In FIG. 9, around the light divider 1 or 11 in the first or second embodiment, a light source 7 is disposed as a second light source for illuminating the boundary between the pupil and the iris, or the boundary between the white and iris of the eye.

The light source 7 is an infrared light emitting element. The light source 7 also is connected to the control unit 41, and its turn-on is controlled by the control unit 41. This light source 7 directly illuminates the photographer's eye 61 without using a light projecting optical system.

A light source 6 is used as a first light source for detecting Purkinje's first image. In the other points, the construction of the present embodiment is similar to that of the first and second embodiments.

The image of the boundary between the pupil and the iris or the image of the eye 61 by the light source 7, like the Purkinje's first image by the light source 6, is formed on the light receiving element 4. This image signal of the eye also is sent to the control unit 41.

As described above, besides the light source 6 for detecting Purkinje's first image, the light source 7 for illuminating the boundary between the pupil and the iris is provided, whereby the Purkinje's first image and the boundary between the pupil and the iris can be illuminated with optimum illuminance, and the position of the Purkinje's first image and the position of the center of the pupil can be efficiently detected and the direction of line of sight can be calculated.

However, it is difficult to discriminate between the corneal reflected image by the light source 7 and the Purkinje's first image by the light source 6, and this leads to the possibility that the position of the corneal reflected image by the light source 7 is detected and the accurate direction of line of sight cannot be calculated. In such case, the light source 6 and the light source 7 can be turned on alternately and the position of the Purkinje's first image and the position of the center of the pupil can be detected alternately to thereby calculate the direction of line of sight. The details of the control of these light sources will be described later.

The detection of the line of sight will now be described.

Figure 10:
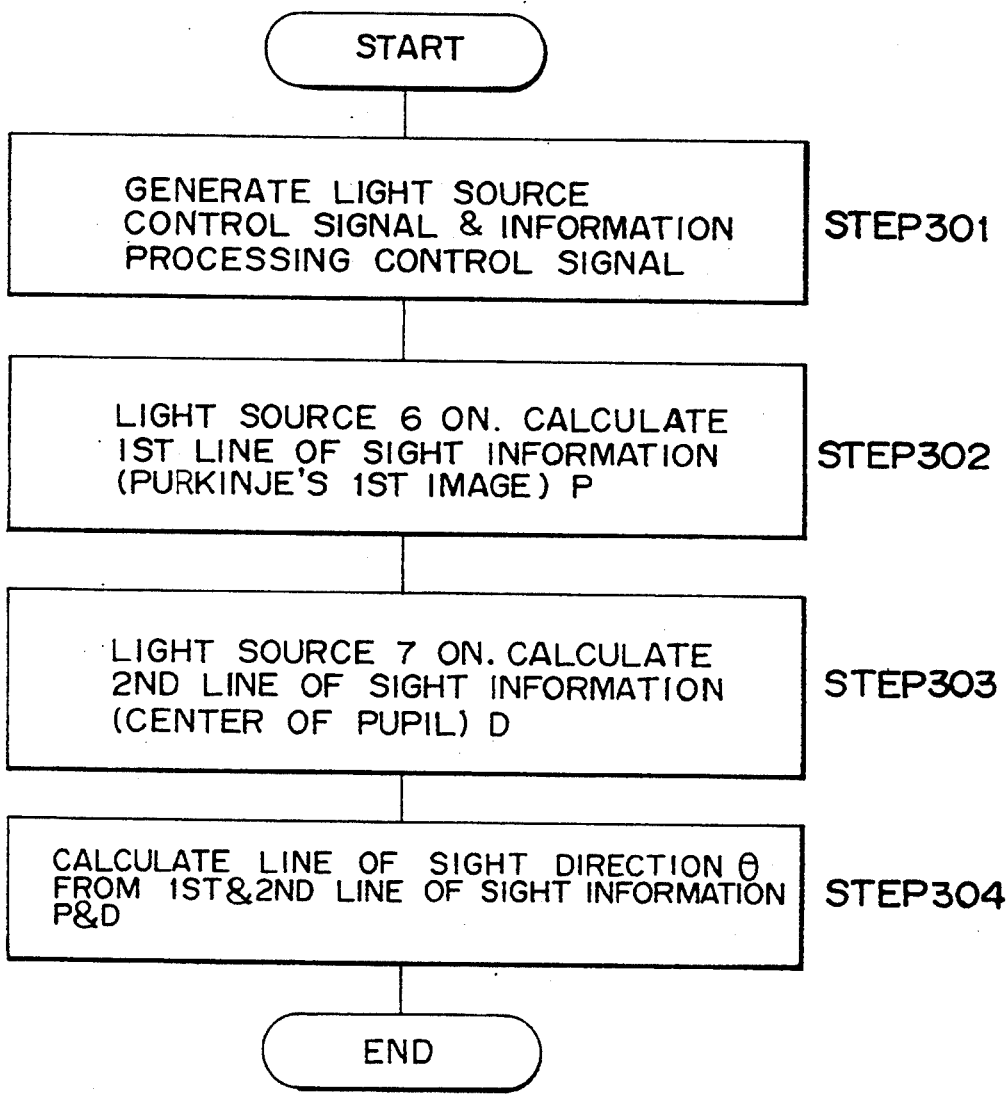
FIG. 10 is a flow chart showing the sub-routine of line of sight detection.

FIG. 10 is a flow chart of the line of sight detection subroutine.

Figure 11:
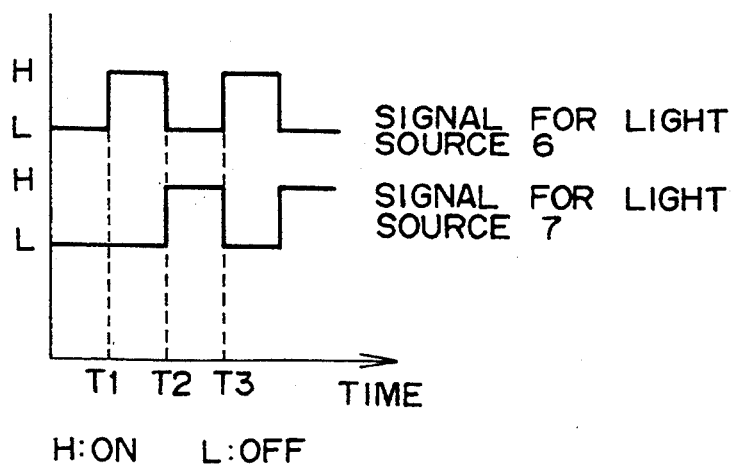
FIG. 11 shows control signals for a light source 6 and a light source 7.

In FIG. 10:

STEP 301: Here, a signal for the control of the turn-on of the light source 6 and light source 7 as shown in FIG. 8 and a control signal for signal processing from the light receiving unit 51 are generated, whereby the turn-on of the light source 6 and light source 7 and the signal processing for the detection of the line of sight are controlled. These processes are carried out in the control unit 41. In FIG. 11, the axis of abscissas represents the lapse of time. In FIG. 11, the upper signal shows a control signal for the control of the turn-on of the light source 6 and the calculation of the position of the Purkinje's first image, and the lower signal shows a control signal for the control of the turn-on of the light source 7 and the calculation of the position of the center of the pupil. The control of the turn-on of the light source 6 and light source 7 is not limited to what has been described above, but these light sources may be turned on at a time.

Figure 12:
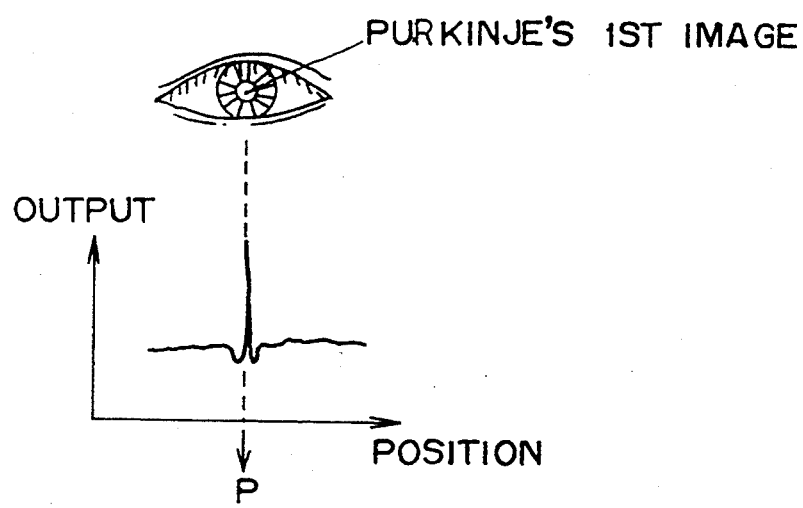
FIG. 12 shows the output of a light receiving position with respect to Purkinje's first image.

STEP 302: Here, the control of the turn-on of the light source 6 and the processing of the signal from the light receiving unit 51 are effected on the basis of the upper one of the signals generated at STEP 301. When the signal is in H (high) state, the light source is turned on and the position of the Purkinje's first image is calculated from the signal from the light receiving unit 51. The position of the Purkinje's first image is found as a peak position P from the output of the light receiving unit 51 as shown in FIG. 12.

Figure 13:
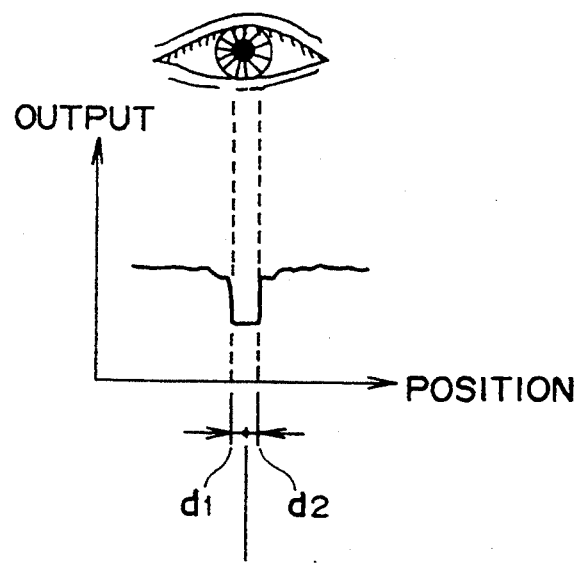
FIG. 13 shows the output of the light receiving portion with respect to the position of the center of pupil.

STEP 303: Here, the control of the turn-on of the light source 7 and the processing of the signal from the light receiving unit 51 are effected on the basis of the lower one of the signals generated at STEP 301. When the signal is in H (high) state, the light source is turned on and the position of the center of the pupil is calculated from the signal from the light receiving unit 51. Boundaries d1 and d2 in which the output of the light receiving unit 51 as shown in FIG. 13 becomes concave are detected from said output, and the position of the center of the pupil is found is the central position D thereof. The upper control signal and the lower control signal are both in L (low) state until a time T1 as shown in FIG. 8, and the detection of the line of sight is not effected. At T1−T2, the upper control signal is in H state and the lower control signal is in L state. Accordingly, the light source 6 is turned on and the detection of the position of the Purkinje's first image is effected. The light source 7 is turned off and the detection of the position of the center of the pupil is not effected. At T2−T3, the upper control signal is in L state and the lower control signal is in H state. Accordingly, the light source 6 is turned off and the detection of the position of the Purkinje's first image is not effected, while the light source 7 is turned on and the detection of the position of the center of the pupil is effected. Thereafter, the state at T1−T2 and the state at T2−T3 are repeated, and on the basis of this signal, the control of the turn-on of the light sources is effected by the light source drive unit 52. Simultaneously therewith, the detection of the position of the Purkinje's first image and the detection of the position of the center of the pupil are effected.

STEP 304: Here, the line of sight direction $\theta$ is calculated from the Purkinje's first image position information P and the pupil center position information D calculated at STEP 302 and STEP 303. The line of sight direction $\theta$ is calculated from the above-mentioned expression, and the line of sight detection subroutine is terminated.

By such a construction, the Purkinje's first image and the pupil can be illuminated with appropriate illuminance and the position of the Purkinje's first image and the position of the center of the pupil can be efficiently detected to thereby calculate the direction of line of sight.

Figure 14:
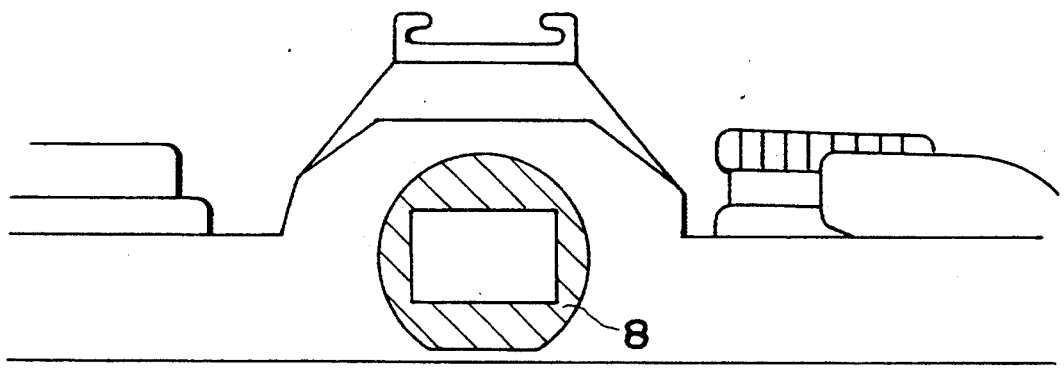
FIG. 14 shows the disposition of a diffusing plate in a fourth embodiment of the present invention.

FIG. 14 shows a fourth embodiment of the present invention. In the fourth embodiment, a diffusing plate 8 is disposed between the light source 7 and the eye 61. When the light source 7 is turned on, a light beam is diffused by the diffusing plate 8 and illuminates the eye 61. By the boundary between the pupil and the iris being thus illuminated by the diffused light, the intensity of the corneal reflected image by the light source 7 becomes small and it becomes easy to detect the boundary between the pupil and the iris. Also, the discrimination between the corneal reflected image by the light source 7 and the Purkinje's first image by the light source 6 becomes easy. Therefore it becomes possible to effect the detection of the position of the Purkinje's first image by the light source 6 and the detection of the position of the center of the pupil by the light source 7 at a time. Also, by the light source 6 and the light source 7 being turned on alternately and the position of the Purkinje's first image and the position of the center of the pupil being detected alternately, it becomes possible to calculate the direction of line of sight more accurately. In the other points, the present embodiment is similar to the third embodiment.

According to the present invention, the optical axes of the observation optical system, the illuminating means and the light receiving means are disposed so as to differ from one another. Therefore it never happens that in the observation optical system, the illuminating light creates ghost, and it becomes possible to calculate the direction of line of sight efficiently.

Figure 15:
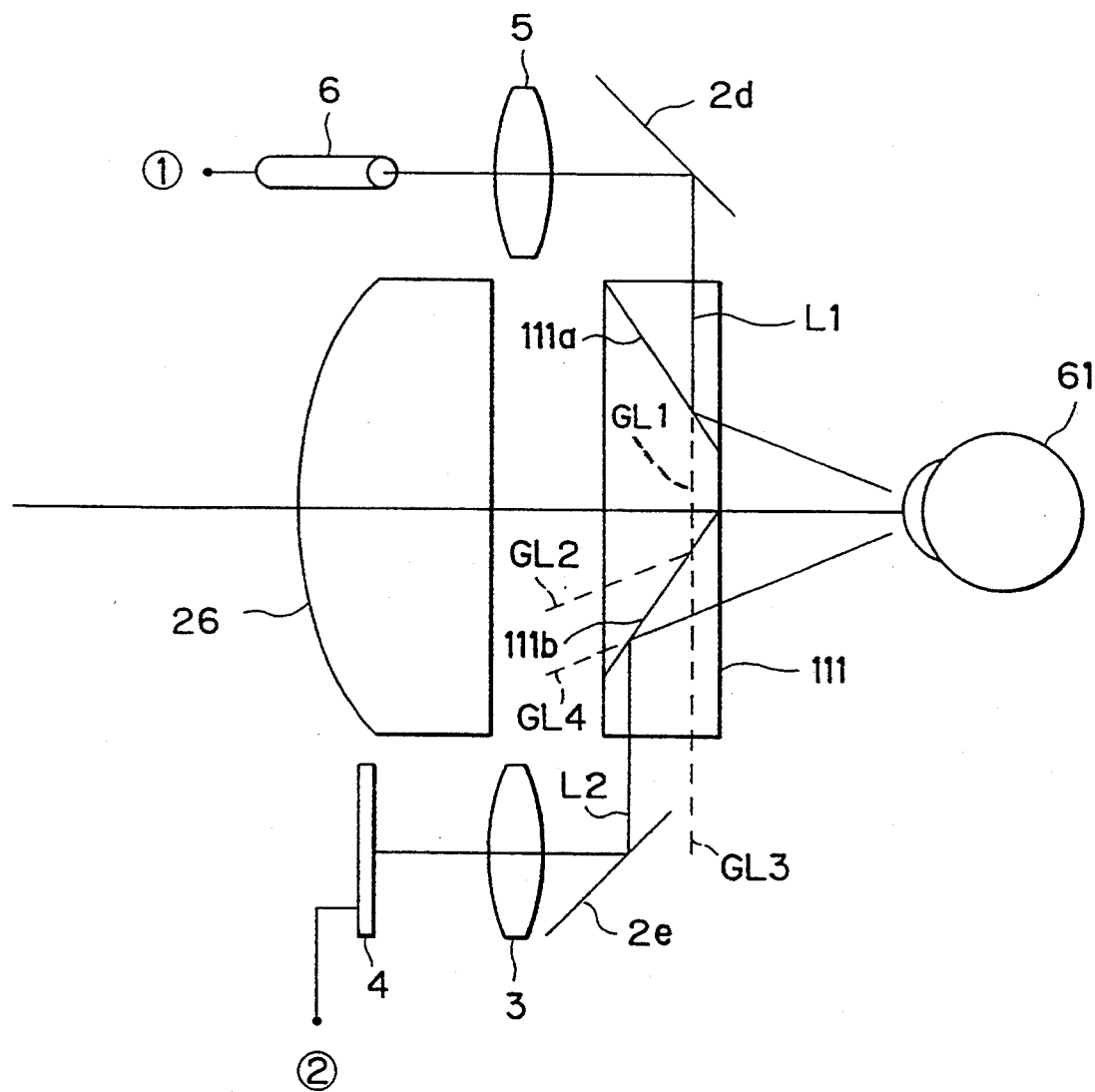
FIG. 15 is a schematic view of the optical system of a camera with a line of sight detecting device according to a fifth embodiment of the present invention.

FIG. 15 is a schematic view of the optical system of a camera with a line of sight detecting device according to a fifth embodiment of the present invention.

In FIG. 15, members given the same reference characters as those in FIG. 1 are functionally similar to the members described in connection with FIG. 1 and therefore need not be described.

Light dividing surfaces 111a and 111b in a light divider 111 are dichroic mirrors transmitting visible light therethrough and reflecting infrared light like the light dividing surfaces 1a and 1b in FIG. 1. Mirrors 2d and 2e also are total reflection mirrors having a function similar to that of the mirrors 2a and 2b in FIG. 1. However, the light dividing surfaces 111a, 111b and the mirrors 2d, 2e differ in arrangement and construction from those in FIG. 1 and therefore will be described hereinafter.

The light dividing surfaces 111a, 111b and the mirrors 2d, 2e are disposed so that the optical axis of light L1 reflected by the mirror 2a and the optical axis of light L2 reflected by the light dividing surface 111b may differ from each other.

The effectiveness of such disposition will now be described.

As previously described, the light dividing surfaces 111a and 111b are dichroic mirrors transmitting visible light therethrough and reflecting infrared light. However, the dichroic mirror transmits therethrough several percent of the whole quantity of light of an infrared light beam incident thereon. When the several percent of the infrared light beam which has been transmitted through the dichroic mirror enters the light receiving element 4, it becomes ghost and the detection of the direction of the line of sight may become difficult. Along what optical path the ghost light which is the transmitted infrared light beam travels in the present embodiment will hereinafter be described with reference to FIG. 15.

Of the light L1 reflected by the mirror 2d, most of the ghost light GL1 transmitted through the light dividing surface 111a in the light divider 111 is reflected by the light dividing surface 111b. The ghost light GL2 reflected by the light dividing surface 111b does not enter the light receiving element 4 because it emerges toward the eyepiece 26. Also, of the ghost light GL1, ghost light GL3 transmitted through the light dividing surface 11b neither enters the mirror 2e nor enters the light receiving element 4. Ghost light GL4 reflected by the eye 61 and passed through the light dividing surface 11b neither enters the light receiving element 4.

As described above, in the fifth embodiment, the light dividing surfaces 111a, 111b and the mirrors 2d, 2e are designed such that the optical axes of the light L1 and light L2 deviate from each other as shown in FIG. 15, whereby it never happens that the detection of the direction of the line of sight becomes difficult due to the influence of ghost light.

The control or the like for the detection of the line of sight, excepting the disposition and construction of the light dividing surfaces 111a, 111b and mirrors 2d, 2e is entirely the same as that in the aforedescribed first embodiment and therefore need not be described here.

As described above in each embodiment, the eyepiece which is a portion of the observation optical system, the light projecting optical system and the light receiving optical system are disposed so that their respective optical axes may differ from one another, and the light divider is disposed between the eyepiece and the eye. By adopting such disposition, even if ghost light is created, it is difficult for the ghost light to enter the light receiving optical system because the optical axes differ. Also, there is little transmitting surface which creates ghost light because the infrared light beam emitted from the light source does not pass through the observation optical system.

What is claimed is:

1. A camera with a line of sight detecting device, comprising:
    an observation optical system for observing an object therethrough;
    an illuminating portion which illuminates a photographer's eye;
    photoelectric converting portion which photoelectrically converts reflected light from said eye illuminated by said illuminating portion; and
    a light divider disposed so as to be between said observation optical system and said eye;
    characterized in that the optical axes of said observation optical system, said illuminating portion and said photoelectric converting portion intersect said eye in different directions, said illuminating means illuminates said eye by way of said light divider, and said photoelectric converting portion receives the reflected light from said eye by way of said light divider.

2. A camera according to claim 1, characterized in that said light divider is an optical member having two or more light dividing surfaces and having no refractive power.

3. A camera according to claim 2, characterized in that said illuminating portion includes a first light source for detection of a corneal reflected image of said eye, and a second light source for detection of a boundary between the pupil and iris of said eye or a boundary between the white and iris of said eye.

4. A camera according to claim 3, characterized by the provision of light source changeover portion which change over said first light source and said second light source.

5. A camera according to claim 3, characterized by the provision of a diffusion portion which diffuses the illuminating light of said second light source.

6. A camera according to claim 2, characterized in that said light dividing surfaces include a first surface on which illuminating light of said illuminating portion is incident and a second surface on which illuminating light reflected from said eye is incident, and said first and second surfaces are disposed such that the respective incident lights are incident thereon at different distances from said eye.

7. A line of sight detecting device for detecting a line of sight of a user, comprising:
    an observation optical system for observing an object field;
    an illuminating portion which illuminates an eyeball of the user with illumination light; and
    a light receiving optical system having a light receiving section which receives illumination light reflected by the eyeball of said user;
    characterized in that an optical axis of said observation optical system, an optical axis for illuminating the eyeball of the user by said illuminating portion and an optical axis of said light receiving optical system intersect the eyeball in different directions.

8. A camera with a line of sight detecting device for detecting a line of sight of a photographer, comprising:
    an observation optical system for observing an object field;
    an illuminating portion for illuminating an eyeball of the photographer with illumination light; and
    a light receiving optical system having a light receiving portion for receiving illumination light reflected by the eyeball of the photographer;
    characterized in that an optical axis of said observation optical system, an optical axis for illuminating the eyeball of the photographer by said illuminating portion and an optical axis of said light receiving optical system intersect the eyeball in different directions.

* * * * *